United States Patent [19]

Dobbert

[11] 3,814,978

[45] June 4, 1974

[54] HORIZONTAL DEFLECTION CIRCUIT FOR TELEVISION RECEIVERS

[75] Inventor: Gerd Dobbert, Deizisau, Germany

[73] Assignee: International Standard Electric Corporation, New York, N.Y.

[22] Filed: July 18, 1972

[21] Appl. No.: 272,828

[30] Foreign Application Priority Data

Sept. 7, 1971 Germany .......................... 2144723

[52] U.S. Cl. .......................................... 315/27 TD

[51] Int. Cl. .......................................... H01j 29/20

[58] Field of Search .......... 315/27 R, 27 TD, 28, 29

[56] References Cited

UNITED STATES PATENTS

| | | | |
|---|---|---|---|
| 2,932,765 | 4/1960 | Messina | 315/27 R |
| 3,426,241 | 2/1969 | Derkins | 315/27 TD |
| 3,467,882 | 9/1969 | Young | 315/27 TD |
| 3,714,503 | 1/1973 | West | 315/29 |

*Primary Examiner*—Maynard R. Wilbur
*Assistant Examiner*—J. M. Potenza
*Attorney, Agent, or Firm*—John T. O'Halloran; Menotti J. Lombardi, Jr.; Peter Van Der Sluys

[57] ABSTRACT

A horizontal deflection circuit for a television receiver wherein the high voltage necessary to operate the picture tube is produced by horizontal flyback pulses and an inductance, and a thyristor regulating switch controls the voltage provided to said inductance.

10 Claims, 9 Drawing Figures

HORIZONTAL DEFLECTION CIRCUIT FOR TELEVISION RECEIVERS

BACKGROUND OF THE INVENTION

This invention relates to a horizontal deflection circuit for a television receiver whose horizontal final stage controls line sweep and commutation, and more particularly to such a receiver wherein the necessary energy is applied to the horizontal final stage via a controllable supply circuit.

Horizontal sweep or deflection circuits are known in which, for producing a periodic sawtooth current within the respective deflection coil of the picture tube, the deflection coil is connected, in a first current branch, via a first controlled switch, conductive in both directions, to a sufficiently large capacitor serving as a current source, the controlled switch being formed by the antiparallel or back to back connection of a controlled rectifier with a diode. The control electrode of the rectifier is connected to a driving-pulse source which renders the switch conductive during part of the sawtooth sweep. In this arrangement, the sawtooth flyback, i.e., the current reversal, also called "process of commutation," is initiated with the aid of a second controlled switch.

The first controlled switch is also part of a second current branch which, in series with the controlled switch, contains a second current source and a reactance capable of oscillating. When the first switch is closed, the reactance, essentially comprising a coil and a capacitor, receives energy from the second current source in a certain time interval. This energy, which is taken from the second surrent source, corresponds to the circuit losses caused during the previous deflection period.

In the above-described known basic circuit, however, no consideration is given to the fact that it is common practice to connect the high-voltage transformer, necessary for the operation of the picture tube, to the horizontal final stage, as well.

In another known circuit, which is largely identical to the first described circuit, the high voltage necessary to operate the picture tube is produced by the horizontal flyback pulses being stepped up to the necessary voltage in a step-up transformer and the voltage is applied to the picture tube via a rectifier arrangement. The high voltage transformer is connected in parallel with the deflection system. Since the energy taken from the high-voltage transformer is not constant due to the fact that it is a function of the changes in the beam current, the high voltage must be readjusted because of the finite resistance of the high-voltage source. This means that the energy applied to the horizontal final stage must be equal to the above-mentioned losses of the deflection circuit itself plus the energy necessary to operate the tube.

It has already been mentioned that the energy applied to the horizontal final stage is stored in a reactance. The control of the applied energy is effected by a capacitor, here the flyback capacitor of the horizontal final stage, which is connected to a d.c. voltage source via an inductance inserted between the d.c. voltage source and the capacitor, with the latter being nearly at resonance with this inductance. A change in the applied energy is made by varying the inductance. To this end, a variable inductance, which is represented by a transductor, is connected in parallel. As a controlled variable used for adjusting the transductor, a voltage proportional to the high voltage is used, with suitable control and amplifier elements being interposed. However, this method of controlling the supply of energy involves an undesirable expenditure because the transductor itself represents a component which is expensive from the point of view of materials and production engineering. In a system sense, this control is a so-called "downward" control. This means that, if the control fails, the high voltage may reach values which exceed the rated values.

SUMMARY OF THE INVENTION

Therefore, the main object of this invention is to provide an improved horizontal deflection circuit which permits a simpler and more reliable control of the energy applied to the horizontal final stage.

According to the present invention, there is provided a horizontal deflection circuit for a television receiver having a horizontal final stage controlling line sweep and commutation, the energy required by said horizontal final stage being provided by a controllable supply circuit which comprises a source of d.c. energy, a storage inductance connected in series with said d.c. source, and an electronic switch coupled to said storage inductance for controlling the energy stored therein.

It is a feature of this invention that the control range is considerably higher than in the known circuits, which is particularly important when it is realized that the voltage of the d.c. source is not exactly constant, but may also vary within a certain range because this voltage is derived from the line voltage.

It is another feature of this invention that the applied energy is controlled by the electronic switch extending the time of application of the supply voltage of the d.c. source to the storage inductance beyond the duration of the process of commutation, depending on variations of the beam current of the picture tube and/or on variations of the supply voltage.

Further objects and features of this invention will become more apparent by reference to the following description taken in conjunction with the accompanying drawings, in which:

DESCRIPTION OF THE PREFERRED EMBODIMENT

Figure 1:
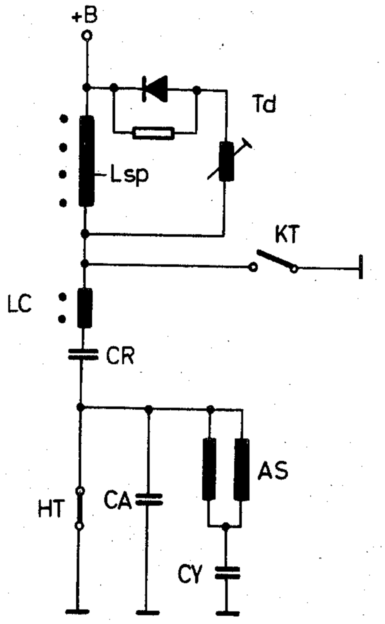
FIG. 1 illustrates a schematic diagram of a known control circuit.
Figures 2A, 2B:
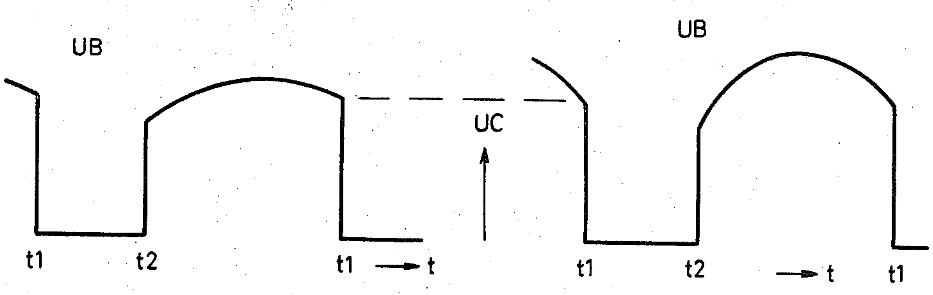
FIGS. 2*a* and 2*b* illustrate the waveform of the capacitor voltage of the circuit illustrated in FIG. 1.

FIG. 1 is a schematic diagram showing the horizontal deflection circuit known in the prior art in highly simplified form. For a better understanding, in FIG. 1 only the principle of the known circuit, in which the applied energy is controlled by means of a transducer, is illustrated. The pertinent timing diagrams are shown in FIGS. 2*a* and 2*b*. The main purpose of the simplification being to facilitate the understanding of the feeding process.

At the beginning of the commutating process t1 in FIG. 2*a*, the commutating switch KT is closed, and the storage inductance Lsp is connected in the closed circuit of the d.c. source +B: i.e., +B, Lsp, KT, ground; and the current flowing through the storage inductance causes magnetic energy to be fed into said inductance. After the end of the process of commutation, at the instant *t*2 in FIG. 2*a*, the energy stored in the storage inductance is applied via the commutating coil LC to the capacitors CR and CA and charges said capacitors, with the line-sweep switch HT closed and the commutating switch KT open. The voltage waveform at the output of the storage inductance Lsp is sinusoidal because the storage inductance along with the capacitors, mainly, however, the capacitor CR must be considered here, form a series-resonant circuit. For the charging of the capacitor CR, the presence of the commutating coil LC may be left out of consideration because the inductance of this coil as against the storage inductance Lsp is negligible.

Shortly before the beginning of the line sweep, the commutating switch KT is closed again; this again corresponds to the instant *t*1. As a result, the capacitor CR discharges via the commutating switch KT and the commutating coil LC at one end and the still closed line-sweep switch HT at the other. Here, it must be borne in mind that, in the actual circuit, the schematically drawn switches are thyristors. It must also be considered that, at this instant, the discharge current of the capacitor CR becomes bigger than the line-sweep current through the thyristor serving as the line-sweep switch HT, i.e. the capacitor CR takes over the line-sweep current of the deflection circuit for a short time. The result of this is that the thyristor of the line-sweep switch HT becomes currentless for that short time, which, in practice, is about 5 microseconds, which results in the thyristor of the line sweep switch HT being blocked. Now the horizontal flyback begins. The charge energy on the capacitor CR is taken over in the deflection circuit by the capacitors CY and CA.

From this simplified description, one can derive the following: The energy required in the deflection circuit is stored in the capacitor CR. A measure of the stored energy is the voltage across the capacitor CR at the instant *t*1, with the capacitor CR being charged through the storage inductance Lsp, as shown, and the waveform of the voltage, i.e. of the resonance voltage, determines the energy of the capacitor CR. A comparison of the voltage waveforms as shown in FIGS. 2*a* and 2*b* makes this clear. FIG. 2*a* shows the waveform of the voltage UC across capacitor CR at a lower value of the d.c. voltage UB of the d.c. source +B, while FIG. 2*b* shows the waveform at an increased d.c. voltage UB. If variations of the d.c. voltage UB are to have no effect on the stored energy, the waveform of the resonance voltage must be changed in this known circuit; this is accomplished, in this known circuit, by varying the inductance with the aid of the regulating transductor T*d*. In so doing, one has to put up with the following disadvantages; the control characteristic of the transductor is not linear, and, to a lesser extent, the available control range limits the range in which both variations of the supply voltage source +B and variations of the load on the high-voltage source can be controlled.

Figure 3:
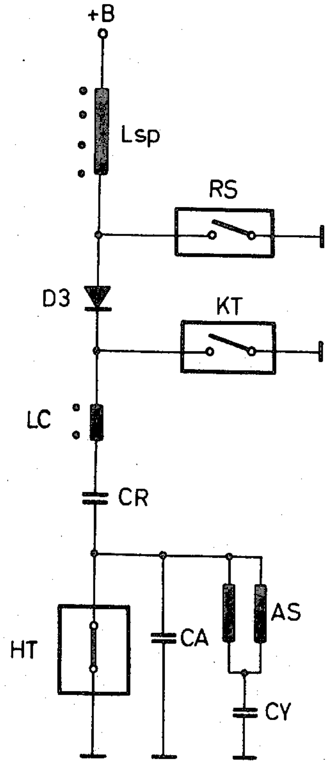
FIG. 3 is a schematic diagram of the circuit made in accordance with the invention.

Referring now to FIG. 3, the transductor T*d* has been replaced by a regulating switch RS inserted between the output of the storage inductance Lsp and ground. The period during which the storage inductance Lsp is connected between the supply current source +B and ground, i.e., during which the supply voltage UB is applied to Lsp, is now determined not only by the closing time of the commutating switch KT, but also by the closing of the regulating switch RS. The above period can be extended beyond the closing time of KT, and thus the energy received in the storage inductance can be increased. This may be readily understood by comparing the process to the switching-on process of an inductance and in further explanation, reference is made to FIGS. 4*a* and 4*b*. As already explained, the voltage UC across the charging capacitor CR depends on the energy of the storage inductance. Taking into account these conditions, the value of the voltage UC across the charging capacitor can be given, with sufficient approximation, as $$UC \approx (UB \cdot tH/tH - tS) \tag{1}$$

wherein UB is the supply voltage of the supply-current source +B, *t*H is the total line duration, and *t*S is the closing time of the regulating switch RS. Thus, if in the case of a change in the voltage UB, the voltage across capacitor CR is to be stabilized, the closing time tS must be changed. From equation (1) it follows that $$tS \approx tH\,(UC - UB)/UC \tag{2}$$

Figures 4A, 4B:
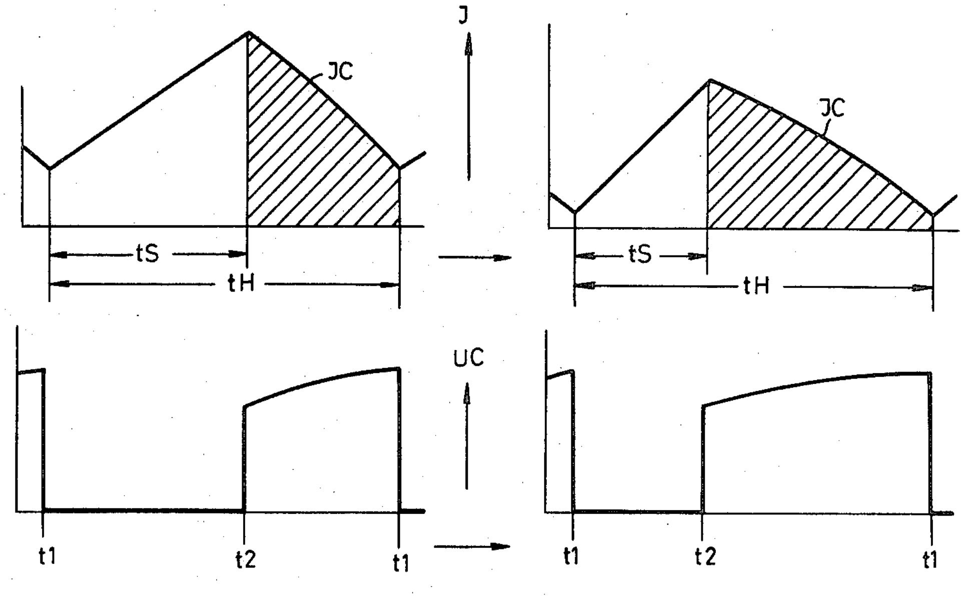
FIGS. 4*a* and 4*b* illustrate the voltage and current waveforms of the circuit of FIG. 3.

Referring now to FIGS. 4*a* and 4*b*, there is illustrated the corresponding processes for a lower value of *UB* and a higher value of *UB*, respectively, assuming, however, that in both cases the charge on capacitor *CR* is the same. A measure of the charge is the hatched area below the part of the current waveform designated *IC*. Equation (1) also shows that the control range of this circuit is very broad because, in the case of a change in *tS* in the range from 0 to (*tH*/2), the voltage across capacitor *CR* varies by the factor 2.

Figure 5:
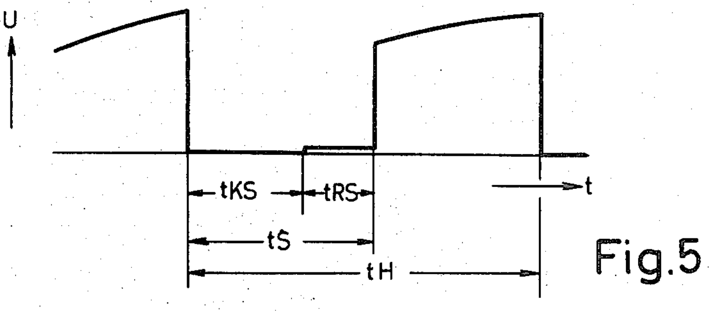
FIG. 5 illustrates the extension of the closing time tS by addition of the switching time *t*RS.
Figure 6:
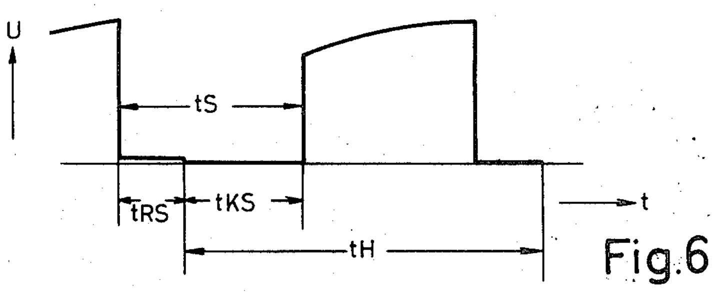
FIG. 6 illustrates the suitable choice of the beginning of the switching time *t*RS.

As illustrated in FIG. 5, the closing time *tS* is the sum of the duration of the commutating process tKS, during which the commutating switch KT is closed, plus the time tRS, for which the regulating switch is closed beyond that duration, if necessary. FIG. 5 also shows that, in this case, the regulating switch must switch off under load. This however, is unfavorable to the switch, i.e. in this case switches must be chosen which are disconnectable under load. As illustrated in FIG. 6, it is much more advantageous to place the additional closing time *t*RS, which is achievable by means of the regulating switch RS, before the commutating time tKS. Thus, the regulating switch can be reopened during the commutating time, i.e., it can be switched off in the currentless and dead condition. This measure results in the advantage that thyristors, particularly advantageously inexpensive, non-disconnectable ones, can be used as regulating switches. In addition the proper disconnection of the thyristor can be achieved if a low positive bias is applied to the cathode of the thyristor.

Diode D3, shown in FIG. 3 is a decoupling diode which prevents the process of commutation from being influenced by the regulating switch RS. To protect this diode D3 from voltage peaks, which may be caused by the steep turn-on edge of the thyristor, used as a regulating switch, a protective circuit, e.g. in the form of a small inductance with parallel resistance, may be provided at the anode of the thyristor.

Figure 7:
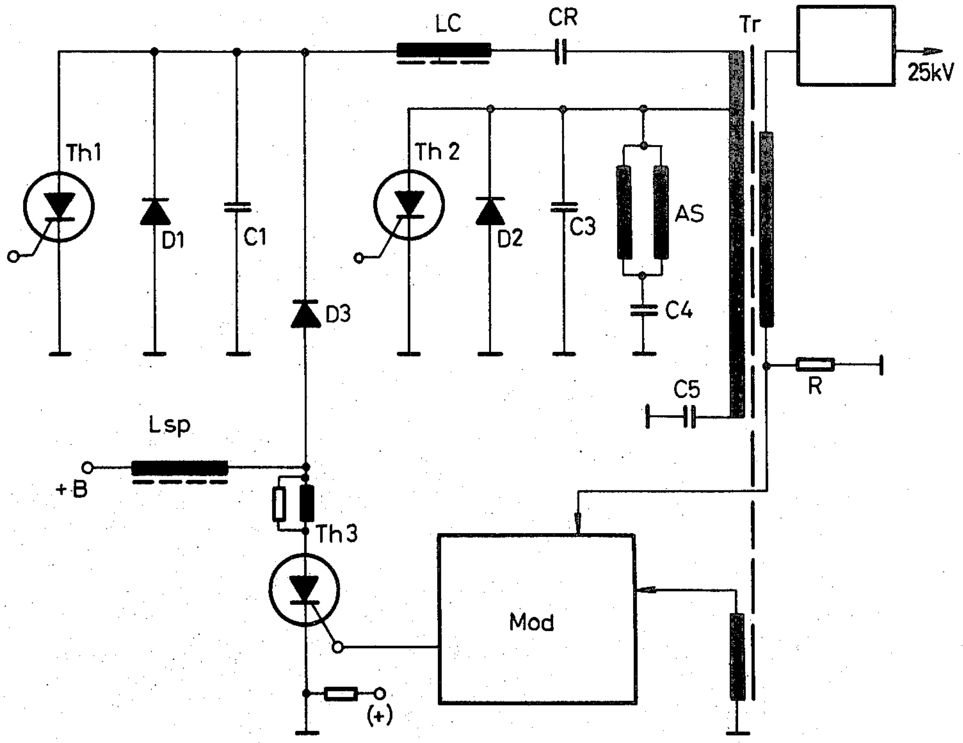
FIG. 7 shows the overall circuit with closed control circuit.

FIG. 7 shows a simplified diagram of the overall circuit with closed control circuit. Here, the commutating switch KT substantially comprises the thyristor Th1, the diode D1, and the capacitor C1. The line-sweep part consists of the thyristor Th2, the diode D2, and the capacitor C3, with the deflection circuit additionally containing the deflection coils AS and the capacitor C4. Designated Tr is the transformer serving as the high-voltage source.

As can be seen in FIG. 7 the capacitor CR is connected to an additional tap of the high-voltage transformer Tr. This is due to the fact that the supply voltage UB is obtained directly by simple rectification of the line d.c. voltage of e.g. 220 V. Due to the design of the overall circuit, the absence of the above measure involves the risk of the supply of energy being too large at such a value of the supply voltage. This risk could be eliminated by suitably varying the capacitance of the capacitor CR, but then safe blocking of the thyristor Th2 would not be insured. By suitable choice of the additional tap, however, these possible difficulties are overcome and it is possible to have a wide selection in the choice of the supply voltage.

Another advantage of the control circuit in accordance with the invention is that the commutating current through the commutating coil LC is so small that the latter, due to the consequently lower power dissipation, can be wound onto one core along with the storage inductance Lsp, without this core having to be enlarged. The turn-on instant for the thyristor Th3, used as the regulating switch RS, is determined by the control circuit designated Mod. Fed to Mod is information on the respective value of the beam current and the value of the high voltage flyback pulses. These values are tapped from a resistor R or a suitable winding or a suitable tap of the transformer winding. It may also be advantageous to feed to this control circuit additional information regarding the value of the supply voltage UB, with suitable decoupling resistors being interposed. From this information, the control circuit Mod, by suitable logic operation, derives the control instruction for firing the thyristor Th3, the control instruction being fed to the gate electrode of the thyristor Th3.

For the construction of the control circuit designated Mod, a great number of circuits are known, and it will therefore not be described here in detail.

While the principles of the invention have been described in connection with specific structure it is to be clearly understood that this description is made only by way of example and not as a limitation to the scope of my invention as set forth in the objects thereof and in the accompanying claims.

I claim:

1. A horizontal deflection circuit for a television receiver having a horizontal final stage including means for controlling line sweep and commutation, the energy required by said horizontal final stage being provided by a controllable supply circuit which comprises:

a source of d.c. energy;

a storage inductance connected in series with said d.c. source, said line sweep and commutation control means formed and arranged to apply d.c. energy to the storage inductance from the d.c. source during predetermined periods; and an electronic switch means for applying d.c. energy to the storage inductance from the d.c. source during additional periods of time in addition to the predetermined periods said additional periods being determined by the energy being supplied by the supply circuit.

2. A horizontal deflection circuit, according to claim 1, wherein said electronic switch means comprises a thyristor.

3. A horizontal deflection circuit for a television receiver having a horizontal final stage including means for controlling line sweep and commutation, the energy required by said horizontal final stage being provided by a controllable supply circuit which comprises:

a source of d.c. energy;

a storage inductance connected in series with said d.c. source, said line sweep and commutation control means formed and arranged to apply d.c. energy to the storage inductance from the d.c. source during predetermined periods; and an electronic switch means for applying d.c. energy to the storage inductance from the d.c. source during additional periods of time in addition to the predetermined periods and subsequent thereto, said additional periods of time being determined by the energy being supplied by the supply circuit.

4. A horizontal deflection circuit for a television receiver having a horizontal final stage including means for controlling line sweep and commutation, the energy required by said horizontal final stage being provided by a controllable supply circuit which comprises:

a source of d.c. energy;

a storage inductance connected in series with said d.c. source, said line sweep and commutation control means formed and arranged to apply d.c. energy to the storage inductance from the d.c. source during predetermined periods; and an electronic switch means for applying d.c. energy to the storage inductance from the d.c. source during additional periods of time in addition to the predetermined periods and prior thereto, said additional periods of time being determined by the energy being supplied by the supply circuit.

5. A horizontal deflection circuit for a television receiver having a horizontal final stage including means for controlling line sweep and commutation, the energy required by said horizontal final stage being provided by a controllable supply circuit which comprises:

a source of d.c. energy;

a storage inductance connected in series with said d.c. source, said line sweep and commutation control means formed and arranged to apply d.c. energy to the storage inductance from the d.c. source during predetermined periods;

means for sensing beam current and the level of high voltage flyback pulses generated in the final stage;

means responsive to the sensed beam current and flyback pulse level for providing a pulse output having a duration corresponding thereto; and electronic switch means responsive to the pulse output from the last mentioned means for applying d.c. energy to the storage inductance from the d.c. source during additional periods of time in addition to the predetermined periods, said additional periods of time corresponding to the duration of the pulse output from the last mentioned means.

6. A horizontal deflection circuit as described in claim 3 wherein said electronic switch means comprises a thyristor.

7. A horizontal deflection circuit as described in claim 4 wherein said electronic switch means comprises a thyristor.

8. A horizontal deflection circuit as described in claim 5 wherein said electronic switch means comprises a thyristor.

9. A horizontal deflection circuit, according to claim 3, additionally comprising:

means for sensing beam current and the level of high voltage flyback pulses generated in the final stage; and means responsive to the sensed beam current and flyback pulse level for providing a pulse output having a duration corresponding thereto, said electronic switch means being responsive to the pulse output for controlling the duration of the additional periods of time during which d.c. energy is applied to the storage inductance.

10. A horizontal deflection circuit, according to claim 4, additionally comprising:

means for sensing beam current and the level of high voltage flyback pulses generated in the final stage; and means responsive to the sensed beam current and flyback pulse level for providing a pulse output having a duration corresponding thereto, said electronic switch means being responsive to the pulse output for controlling the duration of the additional periods of time during which d.c. energy is applied to the storage inductance.

* * * * *